United States Patent [19]

Proulx

[11] Patent Number: 5,685,082
[45] Date of Patent: Nov. 11, 1997

[54] ADJUSTABLE GRADE STICK AND METHOD OF USING SAME

[75] Inventor: Michael Proulx, Wasaga Beach, Canada

[73] Assignee: M&S Minovations Ltd., Wasaga Beach, Canada

[21] Appl. No.: 533,813

[22] Filed: Sep. 26, 1995

[51] Int. Cl.⁶ .................................................. G01C 15/06
[52] U.S. Cl. .......................... 33/286; 33/1 H; 33/296
[58] Field of Search ................................ 33/293, 294, 295, 33/296, 1 H, 19, 166, 286

[56] References Cited

U.S. PATENT DOCUMENTS

| | | | |
|---|---|---|---|
| 685,455 | 10/1901 | Kinkead | 33/286 |
| 958,736 | 5/1910 | Ferris | 33/286 |
| 969,732 | 9/1910 | Tebyrica | 33/295 |
| 1,134,125 | 4/1915 | Hafner | 33/286 |
| 2,169,533 | 8/1939 | Kasten | 33/295 |
| 3,484,136 | 12/1969 | Colson | 33/286 |

FOREIGN PATENT DOCUMENTS

| | | | |
|---|---|---|---|
| 11308 | 2/1981 | Japan | 33/293 |
| 2146768 | 4/1985 | United Kingdom | 33/293 |
| 87/05387 | 9/1987 | WIPO | 33/293 |

*Primary Examiner*—Thomas B. Will
*Attorney, Agent, or Firm*—Bereskin & Parr

[57] ABSTRACT

An adjustable grade stick and method of using the same are used to identify a reference line. The grade stick has a shaft that is adjustable along its length. In a preferred embodiment, the shaft has two sections where one section lies within the other in a variably telescoping manner. A locking device is provided to lock the relative positions of the first and second sections of the shaft. A hook is located at one end of the shaft to mount the shaft on the ceiling of the mine tunnel. A sighting ring is located at the other end of the shaft and has an inner aperture which acts as a marker for a reference point. A calibration scale is located on the shaft for positioning the sighting means at a predetermined location. The reference line is sighted from the sighting rings of a pair of grade sticks. A method of using the grade sticks consists of taking a pair of the adjustable grade sticks, adjusting their lengths to predetermined settings, mounting the grade sticks on the ceiling of a mine tunnel at predetermined locations and aligning the sighting rings on each shaft to form a reference line which is used to guide drilling operations within the mine.

15 Claims, 6 Drawing Sheets

ADJUSTABLE GRADE STICK AND METHOD OF USING SAME

FIELD OF THE INVENTION

This invention relates to grade sticks which are used to guide drilling personnel during drilling in underground mines.

BACKGROUND OF THE INVENTION

In mining, the survey department typically measures and monitors drilling operations. At any one time, drilling may take place at a number of different locations (or stations) within the mine. At each drilling station, there is a direction of drilling, also known as the "development heading", that is established by the survey department. Each development heading has line and grade parameters that are communicated to the operator of the drill rig in the mine tunnel to establish a reference line for drilling. The reference line is used to mark out the drilling area, position equipment and check the accuracy of the drilling. The conventional method in establishing a reference line requires forming and suspending two markers from the ceiling of the mine tunnel to locate two reference points corresponding to the development heading. The line of sight formed by taking a bearing on the two reference points is the reference line used to guide the drilling operator.

The markers used to locate the reference points for the drill rig operator are called "grade chains" or "grade sticks". Grade chains most often comprise a wooden dowel cut to a predetermined length necessary to locate the specific reference point for a specific development heading. Grade chains may alternatively comprise a length of chain cut to the predetermined length. The wooden dowels are more widely used than the chains because the chains are heavier and more costly. As well, the chains do not perform as well in the harsh mine environment, since they tend to become permanently entangled and clogged with dirt and other debris.

The desired length of a grade chain for a given reference point is typically derived by determining the difference between the required vertical position of the reference point and the elevation of the tunnel ceiling at the relevant attachment point for the grade chain. Since the desired length at each reference point is unique to the specific tunnel location, each grade chain must be individually constructed and correlated to its corresponding reference point. Thus, there is a recurring cost associated with supplying the wooden dowels or lengths of chain.

Furthermore, the surveyor generally makes the required measurements at a specific tunnel location, and then returns to the office to cut the lengths of wood or chain corresponding to the required lengths of the grade sticks for the next phase of drilling. This time-consuming process of cutting wooden dowels or lengths of chain is repeated for every new development heading and creates a significant cost in surveyor labour time.

As well, since each length is unique, each grade chain must be correlated somehow to its appropriate corresponding reference point. This is usually accompanied by marking the grade stick or chain with an identifier. However, these markings indicating the appropriate station are often smeared or obliterated and/or the grade chains are often misplaced, damaged or destroyed. Since it takes two reference points to form the desired reference line, the loss of one grade chain will put drilling at a particular station out of operation until a new grade chain can be measured and cut, and a replacement grade chain constructed. This often causes substantial delays, resulting in the loss of precious production time, particularly for night drilling crews who must wait for the surveyors to return in the morning to construct a replacement grade chain.

Accordingly, there is a need for a more cost efficient means in establishing the development heading at each specific tunnel location.

SUMMARY OF THE INVENTION

In one aspect the present invention provides a grade stick for use in a mine tunnel comprising an elongated shaft having an adjustable length; mounting means located at one end of the shaft for hanging said shaft freely from a desired location on the ceiling of the mine tunnel; sighting means attached to the shaft for visually defining a desired reference point in space, the sighting means berg aligned with the longitudinal axis of the shaft; and calibration means for positioning the sighting means at a desired position relative to the mounting means; wherein the length of the mounting means and sighting means is fixed and the length of the shaft may be adjusted to a desired length according to the calibration means to position the sighting means at the desired reference point in space.

In another aspect, the present invention provides a method of marking a reference line for guidance of drilling operations within a mine tunnel comprising the steps of: selecting a pair of grade sticks each having mounting means for hanging the shaft freely from a desired location on the ceiling of the mine tunnel, sighting means for visually defining a desired reference point in space, length adjusting means for adjusting the length of the shaft and calibration means for positioning the sighting means at a desired position relative to the mounting means; adjusting each of said adjustable grade sticks to a predetermined length; mounting each of the grade sticks in a predetermined location; and, aligning the sighting means on the pair of grade sticks to identify the reference line.

It will be recognized that a number of advantages are realized when using the adjustable grade sticks according to the present invention. The adjustable grade sticks may be used and reused for a number of different drilling operations. It is not longer necessary to construct a unique grade stick for each reference point. This saves substantial supply costs and labour costs incurred for constructing each individual grade chain. The efficiency of the drilling process is improved as it is not necessary to correlate each individual grade stick to each reference point for each development heading. Instead, a set of adjustable grade sticks can be conveniently carried with each drill rig or stored in an appropriate area within the mine. The surveyor need only provide the predetermined settings for an adjustable grade stick to the drilling operator. If an adjustable stick gets lost or broken, the operator can easily replace it with another adjustable grade stick and need not wait for the surveyor to replace the missing stick. This reduces delays encountered when a particular grade chain for a particular development heading is broken, misplaced or its identifying markings are smeared or obliterated. Furthermore, as the calibration scale can be divided into relatively small units, the length of the grade stick may be determined with accuracy and precision.

Further advantages of the present invention will become apparent upon review of the specification below.

BRIEF DESCRIPTION OF THE DRAWINGS

For a better understanding of the present invention, and to show more clearly how it may be carried into effect, reference will now be made, by way of example, to the accompanying drawings. The drawings show a preferred embodiment of the present invention, in which.

DETAILED DESCRIPTION OF THE PREFERRED EMBODIMENT

Figure 1:
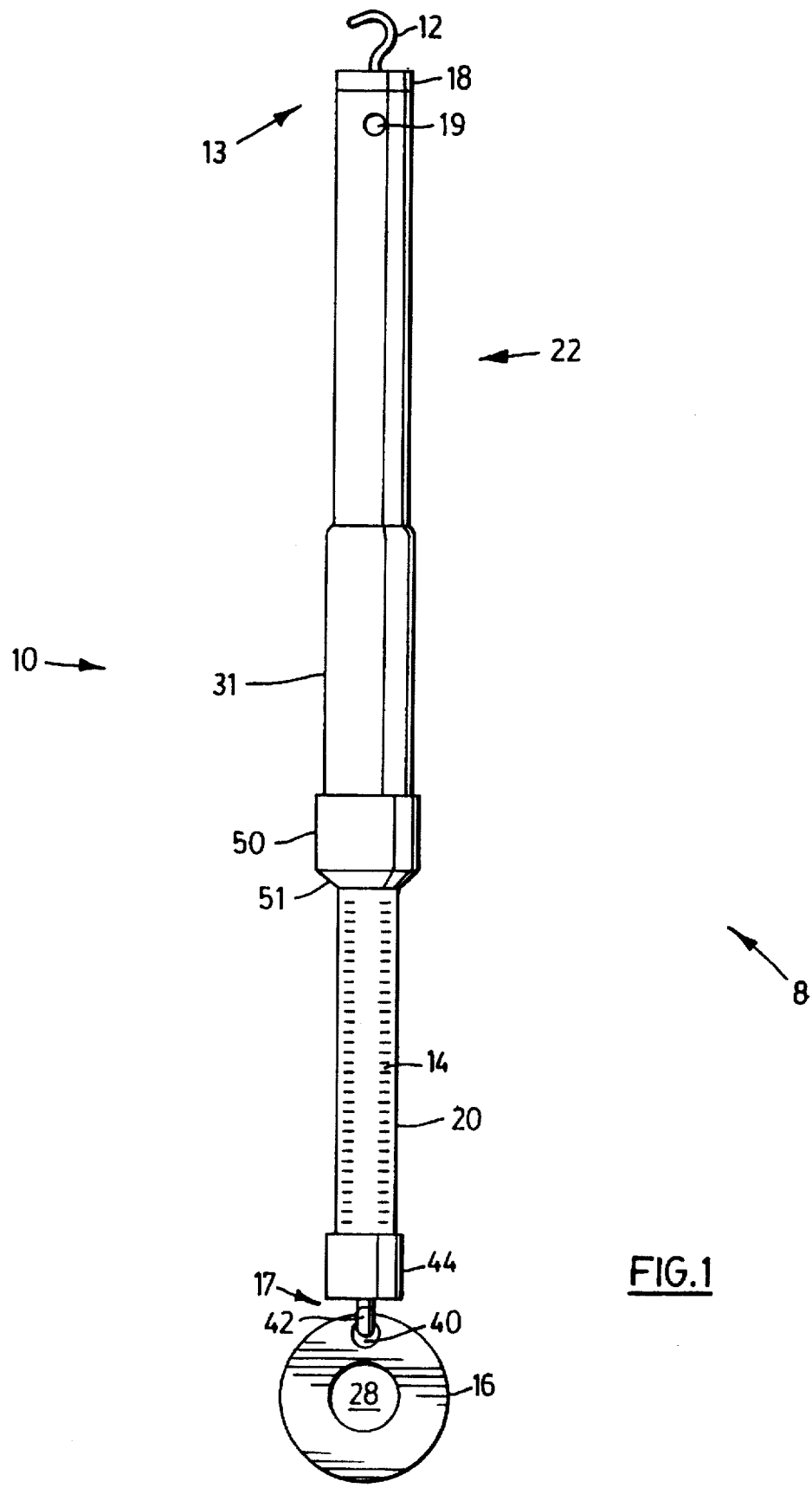
FIG. 1 is a perspective view of an adjustable grade stick in accordance with the present invention.
Figure 2:
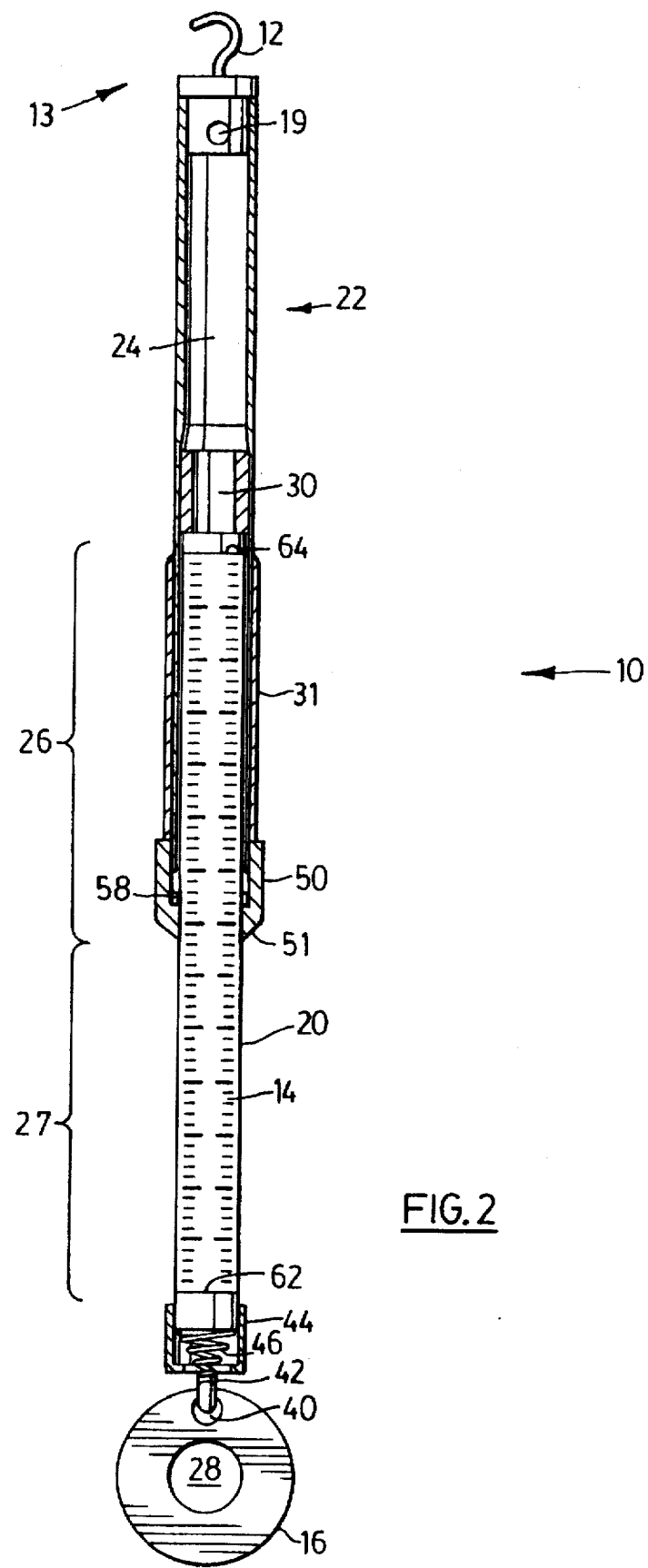
FIG. 2 is a sectioned front view of the grade stick shown in FIG. 1 taken along line 7—7.

Referring to FIGS. 1 and 2, an adjustable grade stick in accordance with the present invention is shown generally at 8. The grade stick 8 includes an adjustable shaft 10; a mounting hook 12; a calibration scale 14, and a sighting ring 16.

The adjustable shaft 10 includes a first section 20 and a second section 22. The second section 22 defines a hollow portion 24. The first section 20 and the second section 22 of the shaft 10 are preferably formed of fibreglass tubing which is brightly coloured for ease in locating the grade stick in the darkness of an underground mine tunnel. The fibreglass is durable to withstand the harsh mine environment and is non-conductive and therefore relatively safe for use in close proximity to high voltage wires, such as those used for electric trolleys, to exposed power supplies, such as batteries on the drilling rigs, or to other electric power sources or devices.

The first section 20 is adapted to be variably and telescopically received within the second section 22, so that a segment 26 of the first section 20 lies within the second section 22. The overall length of the shaft 10 may be extended and contracted over a particular range of extension by adjusting the relative longitudinal positions of the first and second sections 20 and 22, which in turn varies the length of the segment 26 of the first section 20 lying within the second section 22. Thus, the grade stick 8 may be adjusted to a range of varying lengths within the range of extension of the shaft 10.

A locking device 30 is provided to lock the relative position of the first and second sections, 20 and 22, so that the desired length of shaft 10 is maintained to establish and verify the reference line throughout a particular drilling operation. The locking device 30 is releasable so that when a particular drilling operation is completed, the locking device 30 can be disengaged, and the length of the shaft 10 may be shortened for storage or adjusted to a different desired length for the next drilling operation. The locking device will be described in more detail below.

Referring still to FIGS. 1 and 2, means for mounting the shaft 10 from the tunnel ceiling is provided by the mounting hook 12. The mounting hook 12 is preferably formed from brass, but it will be recognized that the hook may be comprised of any other suitable material. The mounting hook 12 is inserted through an end piece 18 that fits over an end 13 of the shaft 10. A threaded fastener 19 removably attaches the end piece 18 to the shaft 10 through convenient holes provided for this purpose. Alternatively, the mounting hook 12 may be replaced by a loop of high tension wire attached to the end piece 18.

A rubber grip 31 is provided on shaft 10. The grip 31 aids in grasping the grade stick 8 during locking and length adjustments of the grade stick 8.

The calibration scale 14 is located on the exterior surface of the first section 20. The scale 14 may be in imperial, metric, or any other desirable unit or units. The numbered markings for the scale are embossed on a clear plastic tape adhered to the exterior surface of the first section 20. Alternatively the scale numbering may be marked directly on the exterior surface of the first section 20. The embossed numbering is covered by a transparent protective coating in order to prevent the markings from being damaged or obliterated in the harsh mine environment.

An indicator 50 is included on the second section 22. The lower edge 51 of the indicator 50 encircles the first section 22 in a plane transverse to the longitudinal axis of the grade stick 8. The lower edge 51 provides a marker for indicating the appropriate number on the calibration scale 14 corresponding to the desired length of the grade stick 8. Thus the indicator 50 provides a convenient means for indicating the desired length of the grade stick 8.

The sighting ring 16 is a large metal ring with an inner aperture 28. The inner aperture 28 provides a marker for locating a reference point in three-dimensional space. Preferably, the external diameter of the ring 16 is 2 inches, and the internal diameter of the ring 16 is 1.5 inches. However, it will be appreciated that other convenient dimensions of the ring 16 may also be used.

The sighting ring 16 includes a hole 40 for receiving an end of an eyelet 42. The other end of the eyelet 42 attaches to a second end piece 44 that fits over an end 17 of the shaft 10. The connection of the eyelet 42 to the end piece 44 facilitates rotational freedom of the eyelet 42 around its longitudinal axis. Therefore, the sighting ring 16 may in turn rotate, or swivel, around the longitudinal axis of the grade stick 8.

As is evident in FIG. 2, the eyelet 42 is secured to a spring 46 contained within the end piece 44. The spring attachment provides some absorption in the connection of the sighting ring 16 to the end piece 44 and will reduce wear on the components should the sighting ring 16 be subjected to forces applied in the longitudinal direction of the grade stick 8.

Figure 6A:
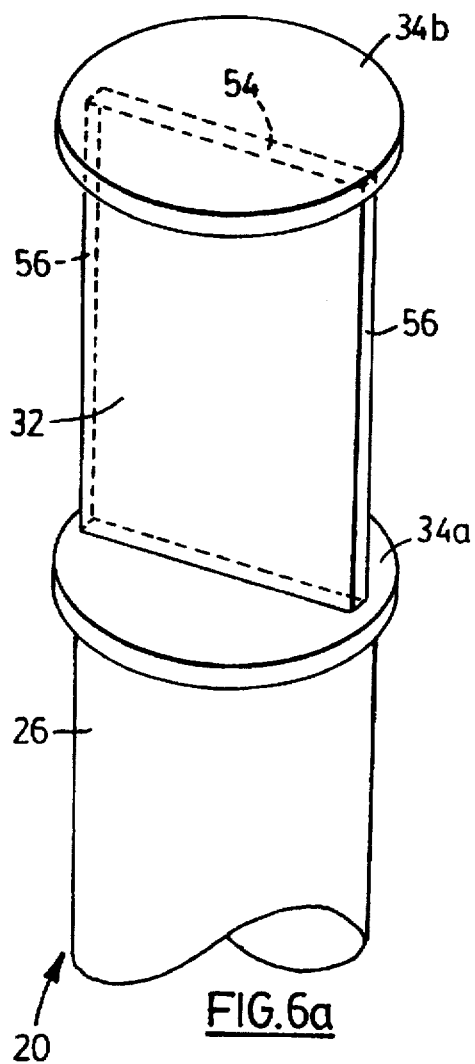
FIGS. 6a to 6d are views illustrating locking means for the adjustable grade stick in accordance with the present invention.

Referring to FIGS. 6a to 6d, the locking device 30 may be more fully explained. The locking device 30 attached to the upper portion of the segment 26 of the first section 20 which lies within the interior 24 of the second section 22. As shown in FIG. 6a, a rectangular plate 32 is oriented in a plane parallel to the longitudinal axis of the grade stick 8. The rectangular plate 32 includes tangential edges 54 and longitudinal edges 56. A circular plate 34a and 34b is attached to each tangential edge 54 of the rectangular plate 32. The circular plates 34 are orientated in planes parallel to the tangential edges 54 of the rectangular plate 32. The circular plates 34 have diameters greater than that of the first section 20 but less than that of the second section 22 of the shaft 10.

Figure 6B:
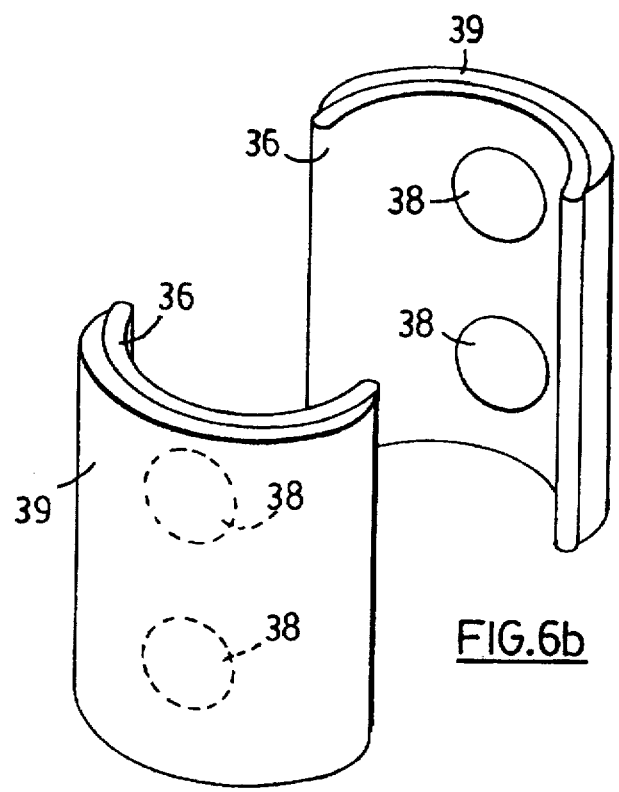

The locking device 30 further includes two halves of a hollow cylindrical plate 36 as illustrated in FIG. 6b. The halves 36 are adapted to fit between the two circular plates 34 to enclose the rectangular plate 32. The halves 36 include lugs 38 which protrude from the interior of the circular halves 36. The halves 36 also include rubber members 39 located on the exterior surface of the halves 36. The external radius of the halves 36 and their respective rubber member 39 are smaller than that of the second section 22.

Figure 6C:
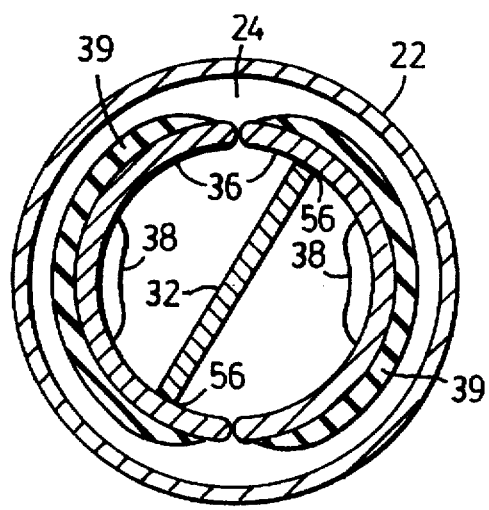
Figure 6D:
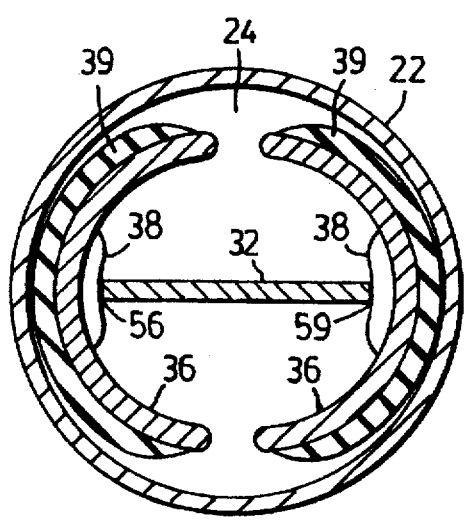

FIGS. 6c and 6d show top sectioned views of locking device 30 in place and illustrate the operation of the locking device 30. The locking device 30 is assembled on the first section 20 and inserted into the hollow interior 24 of the second section 22 along with the segment 26 of the first section 20. In the unlocked position, the longitudinal edges 56 of the rectangular plate 32 do not abut any of the lugs 38, the halves 36 do not abut the interior surface of the second section 22 and the first section 20 may move relatively freely within the second section 22.

However, if the first section 20 is rotated about its longitudinal axis, the longitudinal edges 56 of the rectangular plate rotate until they engage the lugs 38, so that the cylindrical halves 36 are moved outward in the traverse direction. In this manner, the rubber members 39 located on the cylindrical halves are pressed against the interior surface of the second section 22, creating a friction surface sufficient to maintain the first section 20 in place against relatively large forces. The locking device 30 may be released by again rotating the first section 20 until the rectangular plate 32 no longer engages the lugs 38, thereby releasing the cylindrical halves 36 from the interior surface of the second section 22.

Returning again to FIGS. 1 and 2, it will be appreciated that there are physical limits on the range of extension of the grade stick 8. The minimum length of the grade stick 8 occurs when the first section 20 lies almost entirely within the second section 22 so that the end piece 44 abuts against the second section 22. The maximum length of the grade stick 8 occurs when the first section 20 is fully extended from the second section 22 and the lower circular plate 34a of the locking device 30 abuts a protrusion 58 on the second section 22. The protrusion 58 prevents the first section 20 from being removed from the second section 22.

In the preferred embodiment, the minimum length of the grade stick 8 is 100 cm and the maximum length of the grade stick 8 is 187 cm. However, it will be recognized that alternative embodiments may be constructed with alternate extension ranges. For example, other embodiments have been constructed with the following extension ranges:

| Minimum | Maximum |
| --- | --- |
| 120 cm | 227 cm |
| 150 cm | 287 cm |
| 190 cm | 367 cm |

The calibration scale 14 shown in FIGS. 1 and 2 is calibrated to provide an indication of the overall, absolute, length of the grade stick 8, which is the distance from the centre of the mounting hook 12 to the centre of the sighting ring 16. Thus the lowest number appearing on the scale 14 corresponds to the distance from the centre of the mounting hook 12 to the centre of the aperture in the sighting ring 16 when the shaft 10 is at its minimum extension. This number is located on the first section 20 at the point 62 where the end piece 44 on the first section 20 abuts the second section 22. The highest number appearing on the scale 14 corresponds to the overall length of the grade stick 8 when the shaft 10 is at its maximum extension. This number appears at the point 64 on the first section 20 just below the locking device 30. The numbers between are appropriate gradations indicating the intermediate lengths of the grade stick 8 within its range of extension.

With the calibration scale 14 as discussed above, users of the grade sticks will not be required to make any calculations to determine the setting for the desired length of the grade stick 8. It will be recognized that other methods of calibration for the scale 14 may be used, so long as the method used is constant and that users of the grade stick are informed of the particular calibration method that is being used.

It will now be appreciated how the grade stick 8 is used in operation. The surveyor surveys the mine drift at the station where the next phase of drilling is to take place and determines the desired development heading. The line and grade of the reference line which will guide the drilling operator during drilling is determined from the development heading. The locations of two reference points, which when joined will form the reference line, are then established in known manner. An attachment point for attaching a grade stick 8 to the tunnel roof is located for each reference point. A "spad" or any other convenient receiving means is placed at each attachment point. A spad is a cylindrical element with a small hook at either end. A small hole is drilled into the ceiling of the mine tunnel and a receptacle for the spad known as a "transit" is securely positioned in the hole. The spad engages a small protrusion in the receptacle, with the other hook extending from the receptacle to provide a receiving means for the mounting hook 12.

The desired length of the grade stick 8 at any given reference point is the vertical distance from the centre of the hook on the spad to the vertical location of the respective reference point. This length is known to the surveyor as it is determined from the measurements as discussed above. The surveyor will provide the drill rig operator with the desired setting for a grade stick 8 for each reference point depending on the desired length for the grade stick 8 and the calibration of the scale 14.

Figure 4:
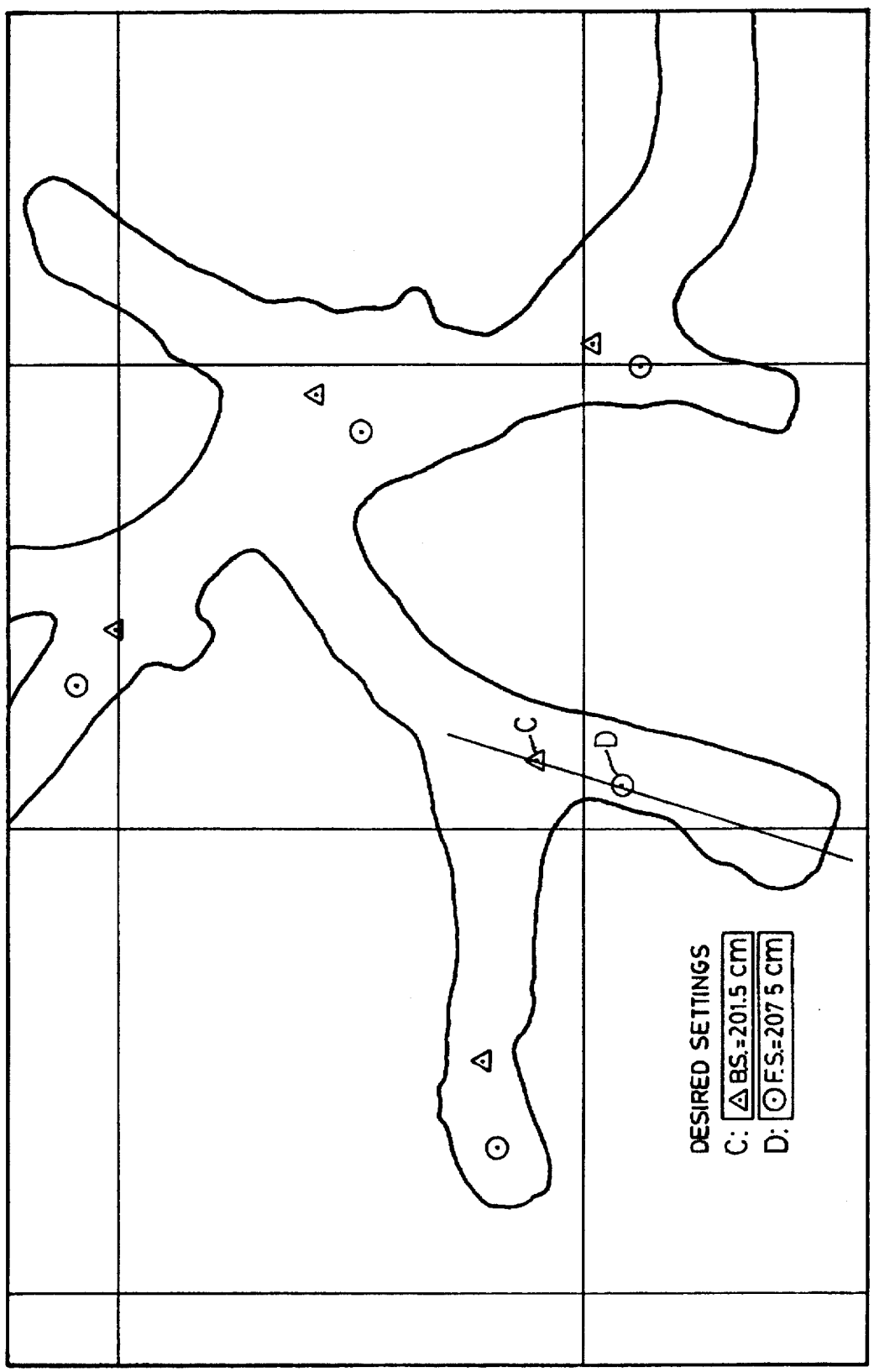
FIG. 4 is an illustration of a drift print including survey notations for use in accordance with the method of the present invention.

Referring to FIG. 4, a typical drift print including the locations of the attachment points and the desired settings for grade sticks. 8 is illustrated. This is the type of information which would be noted and provided to a drill rig operator. The attachment points C and D are located on the drift print. The desired lengths for C and D are noted for each attachment point by providing the required settings on the calibration scale 14 which will yield the desired length of the shaft 10.

Once the operator receives the information containing the predetermined settings, the operator proceeds to mark the reference points and the corresponding reference line in the following manner. Two adjustable grade sticks are selected. The length of each grade stick 8 is adjusted by adjusting the relative longitudinal positions of the first and section sections 20 and 22 until the indicator 50 locates the desired setting on the calibration scale 14. The locking devices 30 are activated to maintain the length of each grade stick 8 at the desired length throughout the drilling operation.

Then, each grade stick 8 is suspended by the mounting hooks 12 at their respective attachment points from a spad or other receiving means. Once suspended in this manner, each sighting ring 16 of each grade stick is located such that the centre of each inner aperture 28 marks a reference point in three-dimensional space. The sighting rings 16 may be rotated or swivelled around the longitudinal axes of the grade sticks 8 so that their inner apertures 28 are aligned. The line of sight formed by taking a bearing on the two reference points, or sighting along these two reference points, is the reference line used for drilling.

Figure 3:
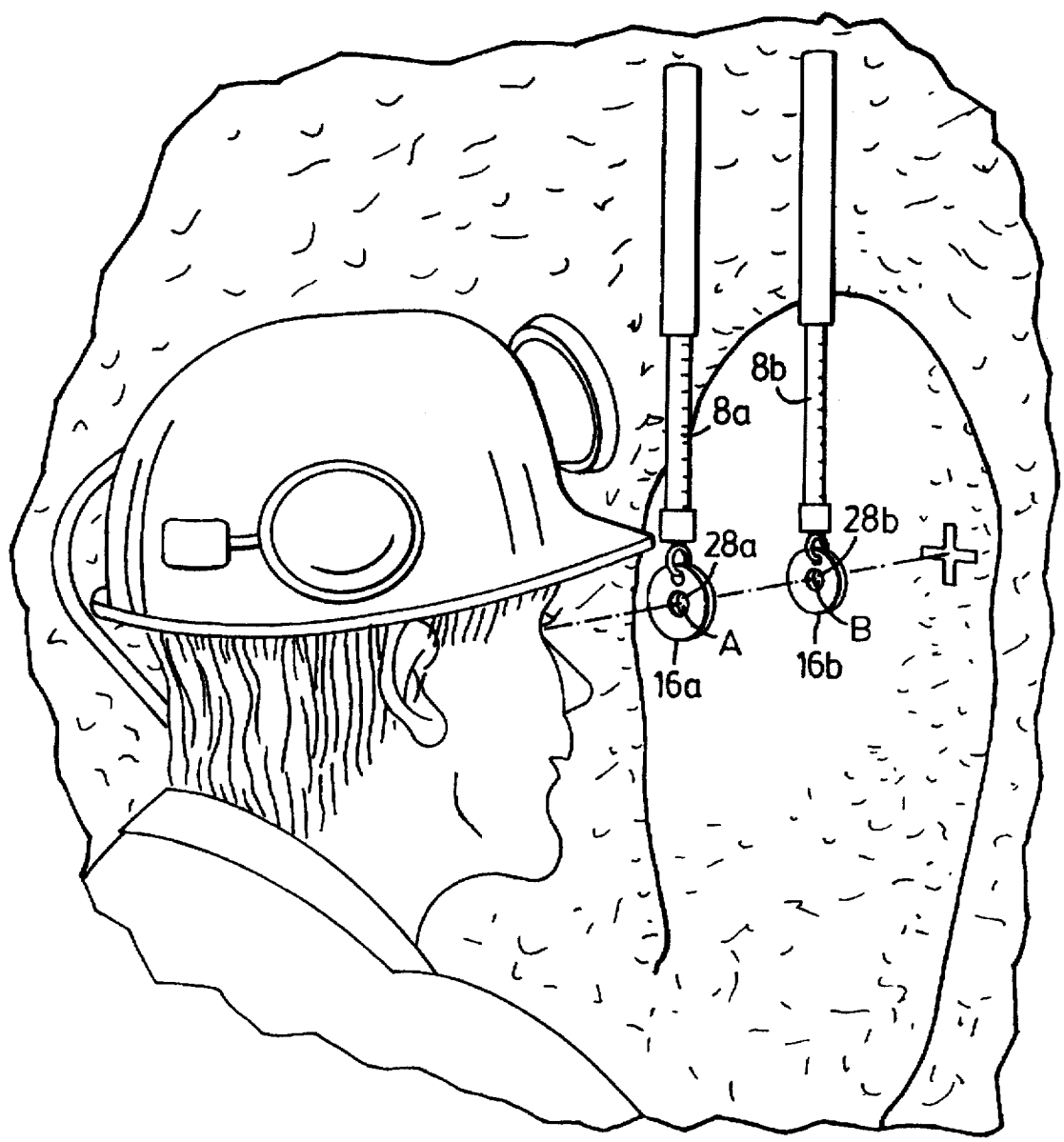
FIG. 3 is an illustration of a method for determining a reference line using two adjustable grade sticks in accordance with the present invention.

Referring now to FIG. 3, two grade sticks, 8a and 8b, are shown in use in a mine tunnel to locate two reference points—A and B. The sighting rings 16a and 16b are correctly positioned so that the apertures 28a and 28b in the sighting rings 16a and 16b are aligned and locate reference points A and B located near eye level of the drilling operator. A line of sight, x, is formed by taking a bearing on A and B. Line x is the reference line used to will guide the operator during drilling.

Figure 5:
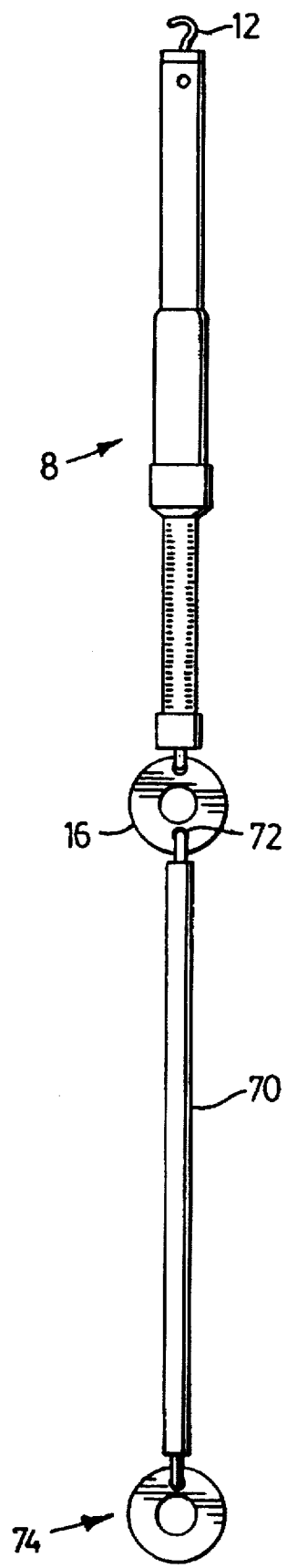
FIG. 5 is a perspective view of an adjustable grade stick including a length extension in accordance with the present invention.

Referring to FIG. 5 a further feature of the present invention is depicted. Although it is contemplated that the maximum achievable length of the grade stick may be extended by simply making the length of the shaft 10 longer, it is undesirable to make the length of the shaft 10 unduly long as the grade stick will then be extremely cumbersome. However, some mine tunnels are very large and have extremely high ceilings and thus the locating reference points within these tunnels will require very long desired lengths. Therefore, it is contemplated that for tunnels with very high ceilings, a portion of the desired length of the grade stick 8 can be provided by a length extension 70, as shown in FIG. 5. The length extension 70 is attached to a small hole 72 drilled in the sighting ring 16 of the grade stick 8. A second sighting ring 74 is located at the lower end of the extension 70. The length extension 70 will have a known length. Variability for a range of desired lengths is provided by the telescoping shaft 10 as before. The length extension 70 is comprised of fine linked chain with dimensions of ¼ inch wide and ⅛ inch thick, known in the art as "stove chain". When a portion of the overall required length is provided by the length extension 70, less length will have to be provided by the rigid shaft 10.

Alternatively, the length extension 70 could be provided by a length of high tension wire.

An embodiment of the present invention has been constructed using telescopically adjustable poles sold under the trade mark STRUCTRON®. These poles are particulary advantageous due to their fluorescent yellow colour and their convenient locking means. The locking device included in the STRUCTRON® pole, incorporates the device as described in FIGS. 6a to 6d. These poles are particulary suited to the harsh mine environment as the locking mechanism is sealed from the external environment preventing dust and particles from entering and damaging the locking device.

While the above description constitutes the preferred embodiment, it will be appreciated that the present invention is susceptible to modification and change without departing from the fair meaning of the proper scope of the accompanying claims.

I claim:

1. A grade stick for use in a mine tunnel comprising:

an elongate shaft having an adjustable length;

mounting means located at one end of said shaft for hanging said shaft freely from a desired location on the ceiling of said mine tunnel;

sighting means attached to said shaft for visually defining a desired reference point in space, said sighting means being aligned with the longitudinal axis of said shaft; and, calibration means for positioning said sighting means at a desired position relative to said mounting means;

wherein the length of said mounting means and sighting means is fixed and the length of said shaft may be adjusted to a desired length according to said calibration means to position said sighting means at the desired reference point in space.

2. The device as claimed in claim 1 wherein said sighting means comprises a ring attached to said shaft.

3. The device as claimed in claim 2 wherein said sighting means is swivelably attached to the other end of said shaft.

4. The device as claimed in claim 1 wherein said mounting means comprises a hook.

5. The device as claimed in claim 1 wherein said shaft comprises first and second sections, said first section being telescopically received within a hollow portion of said second section.

6. The device as claimed in claim 5 further comprising locking means for releasably locking the relative position between said first section and said second section of said shaft.

7. The device as claimed in claim 1 further comprising a flexible length extension attached to said shaft for providing additional length for said grade stick.

8. The device as claimed in claim 7 wherein said length extension comprises a chain.

9. The device as claimed in claim 7 wherein said length extension comprises a high tension wire.

10. A method of marking a reference line for guidance of drilling operations within a mine tunnel comprising the steps of:

selecting a pair of grade sticks each having mounting means for hanging said stick freely from a desired location on the ceiling of said mine tunnel, sighting means for visually defining a desired reference point in space, length adjusting means for adjusting the length of said stick, and calibration means for positioning said sighting means at a desired position relative to said mounting means;

adjusting each of said adjustable grade sticks to a predetermined length;

mounting each of said grade sticks in a predetermined location; and, aligning the sighting means on said pair of grade sticks to identify the reference line.

11. The method of claim 10 wherein each grade stick includes an elongate shaft having an adjustable length.

12. The method of claim 11, each shaft comprising first and second sections, said first sections being telescopically received within a hollow portion of said second sections.

13. The method of claim 12, each grade stick further comprising locking means for releasably locking the relative position between said first section and said second section of each shaft.

14. The method of claim 10 wherein each sighting means comprises a ring attached to each shaft.

15. The method of claim 10 wherein each sighting means is swivelably attached to each shaft.

* * * * *